(12) United States Patent
Choi et al.

(10) Patent No.: US 8,628,895 B2
(45) Date of Patent: Jan. 14, 2014

(54) HYPER-BRANCHED POLYMER, ELECTRODE INCLUDING THE POLYMER, ELECTROLYTE MEMBRANE INCLUDING THE POLYMER, AND FUEL CELL INCLUDING THE ELECTRODE AND/OR THE ELECTROLYTE MEMBRANE

(75) Inventors: Seong-woo Choi, Yongin-si (KR); Cheol-hee Ahn, Seoul (KR); Jung-ock Park, Yongin-si (KR); Mi-jung Yim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 744 days.

(21) Appl. No.: 12/637,073

(22) Filed: Dec. 14, 2009

(65) Prior Publication Data

US 2010/0167166 A1    Jul. 1, 2010

(30) Foreign Application Priority Data

Dec. 16, 2008 (KR) .................. 10-2008-0128181

(51) Int. Cl.
*H01M 4/02* (2006.01)
*H01M 8/10* (2006.01)

(52) U.S. Cl.
USPC ................. 429/530; 429/479; 429/523

(58) Field of Classification Search
USPC ............... 429/479, 481, 484, 523, 530, 531; 502/159; 977/754
See application file for complete search history.

(56) References Cited

U.S. PATENT DOCUMENTS

| 5,525,436 A | 6/1996 | Savinell et al. |
| 6,881,811 B2 * | 4/2005 | Yokotsuka et al. ............. 528/86 |

FOREIGN PATENT DOCUMENTS

| JP | 2005-203265 | 7/2005 |
| JP | 2005-255531 | 9/2005 |
| JP | 2005-283082 | 10/2005 |
| JP | 2007-87714 | 4/2007 |

OTHER PUBLICATIONS

Young H. Kim and Owen W. Webster, Macromolecules, vol. 25, No. 21 (Oct. 12, 1992), American Chemical Society.

* cited by examiner

*Primary Examiner* — Carlos Barcena
(74) *Attorney, Agent, or Firm* — Stein IP, LLC

(57) ABSTRACT

A hyper-branched polymer that has a dendritic unit, a linear unit, a terminal unit, and a degree of branching of about 0.05 to about 1. The hyper-branched polymer can be included in an electrode and/or an electrolyte membrane of a fuel cell.

24 Claims, 5 Drawing Sheets

HYPER-BRANCHED POLYMER, ELECTRODE INCLUDING THE POLYMER, ELECTROLYTE MEMBRANE INCLUDING THE POLYMER, AND FUEL CELL INCLUDING THE ELECTRODE AND/OR THE ELECTROLYTE MEMBRANE

CROSS-REFERENCE TO RELATED APPLICATION

This application claims the benefit of Korean Patent Application No. 10-2008-0128181, filed on Dec. 16, 2008, in the Korean Intellectual Property Office, the disclosure of which is incorporated herein, by reference.

BACKGROUND

1. Field

One or more exemplary embodiments of the present teachings relate to a hyper-branched polymer, an electrode that includes the hyper-branched polymer, an electrolyte membrane that includes the hyper-branched polymer, and a fuel cell employing the electrode and/or the electrolyte membrane.

2. Description of the Related Art

Fuel cells that include a polymer electrolyte membrane operate at relatively low temperatures and can be small in size. Thus, such fuel cells are expected to be used as energy sources in electric vehicles and in distributed generation systems. Perfluorocarbon sulfonic acid-based polymer membranes, such as NAFION membranes, (available from E.I. du Pont de Nemours and Company) are commonly used as polymer electrolyte membranes.

However, such polymer electrolyte membranes should be humidified, in order to sufficiently conduct protons. In addition, to enhance cell system efficiencies, polymer electrolyte membranes should be operated at high temperatures, i.e., at least 100° C. However, the moisture in the polymer electrolyte membrane is evaporated at such temperatures, which reduces the effectiveness thereof.

To address such problems and/or other problems in the related art, non-humidified electrolyte membranes, which may operate at temperatures of at least 100° C., without humidification, have been developed. For example, U.S. Pat. No. 5,525,436 discloses a non-humidified electrolyte membrane made from a polybenzimidazole that is doped with phosphoric acid.

In addition, in cells that operate at low temperatures, such as the cells including a perfluorocarbon sulfonic acid-based polymer membrane, electrodes that include polytetrafluoroethylene (PTFE) as a waterproofing agent have been widely used, to prevent gas diffusion in the electrodes, due to formation of water produced as electricity is generated. For example, Japanese Patent Laid-Open Publication No. 2005-283082 discloses the use of such electrodes.

In addition, phosphoric acid fuel cells, which operate at temperatures of from 150 to 200° C., include a liquid phosphoric acid electrolyte. However, the liquid phosphoric acid interferes with gas diffusion in the electrodes. Therefore, an electrode catalyst layer that includes a polytetrafluoroethylene (PTFE) waterproofing agent, which prevents fine pores in the electrodes from being clogged by the phosphoric acid, has been used.

In addition, in fuel cells including a polybenzimidazole (PBI) electrolyte membrane, which uses a phosphoric acid as a non-humidified electrolyte, to reduce contact between electrodes and the electrolyte membrane, a method of impregnating the electrodes with a liquid phosphoric acid has been used, and a method of increasing a loading amount of metal catalysts has been used. However, such fuel cells do not exhibit improved properties.

In addition, when a phosphoric acid-doped solid polymer electrolyte is used, and air is supplied to the cathode, an activation time thereof is about 1 week, even when an optimized electrode composition is used. Although the performance of the solid polymer electrolyte may be improved, and an aging time may be shortened, as air supplied to the anode is replaced with oxygen, this replacement is undesirable for commercial use. In addition, the polymer electrolyte membrane formed of PBI does not have satisfactory mechanical properties, chemical stability, or the capability of containing a phosphoric acid. Thus, there is still a need for improvement.

SUMMARY

One or more exemplary embodiments of the present teachings provide a hyper-branched polymer, an electrode that includes the hyper-branched polymer, an electrolyte membrane that includes the hyper-branched polymer, and a fuel cell employing the electrode and/or the electrolyte membrane.

One or more exemplary embodiments may include an electrode that includes a catalyst layer including a hyper-branched polymer. The hyper-branched polymer has a dendritic unit represented by Formula 1, a linear unit represented by Formula 2, and a terminal unit represented by Formula 3, and a degree of branching of about 0.05 to about 1.

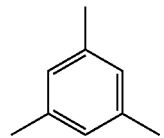

Formula 1

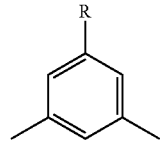

Formula 2

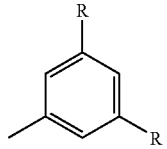

Formula 3

In Formulae 1-3, R is fluorine, a C1-C20 fluorinated alkyl group, a C6-C20 fluorinated aryl group, a C2-C20 fluorinated heteroaryl group, a C6-C20 cycloalkyl group, or a C2-C20 heterocycle group.

One or more exemplary embodiments may include an electrode including: the hyper-branched polymer; or a cross-linked product of the hyper-branched polymer, a benzoxazine-based monomer, and a cross-linkable compound.

One or more exemplary embodiments may include a fuel cell including a cathode, an anode, and a polymer electrolyte membrane interposed between the cathode and the anode. At least one of the cathode, the anode, and the electrolyte membrane may include the hyper-branched polymer, or a cross-linked product of the hyper-branched polymer, a benzoxazine-based monomer, and a cross-linkable compound.

Additional aspects and/or advantages of the present teachings will be set forth in part in the description which follows and, in part, will be obvious from the description, or may be learned by practice of the present teachings.

BRIEF DESCRIPTION OF THE DRAWINGS

These and/or other aspects will become apparent and more readily appreciated from the following description of the exemplary embodiments, taken in conjunction with the accompanying drawings, of which.

DETAILED DESCRIPTION OF THE EXEMPLARY EMBODIMENTS

Figure 1:
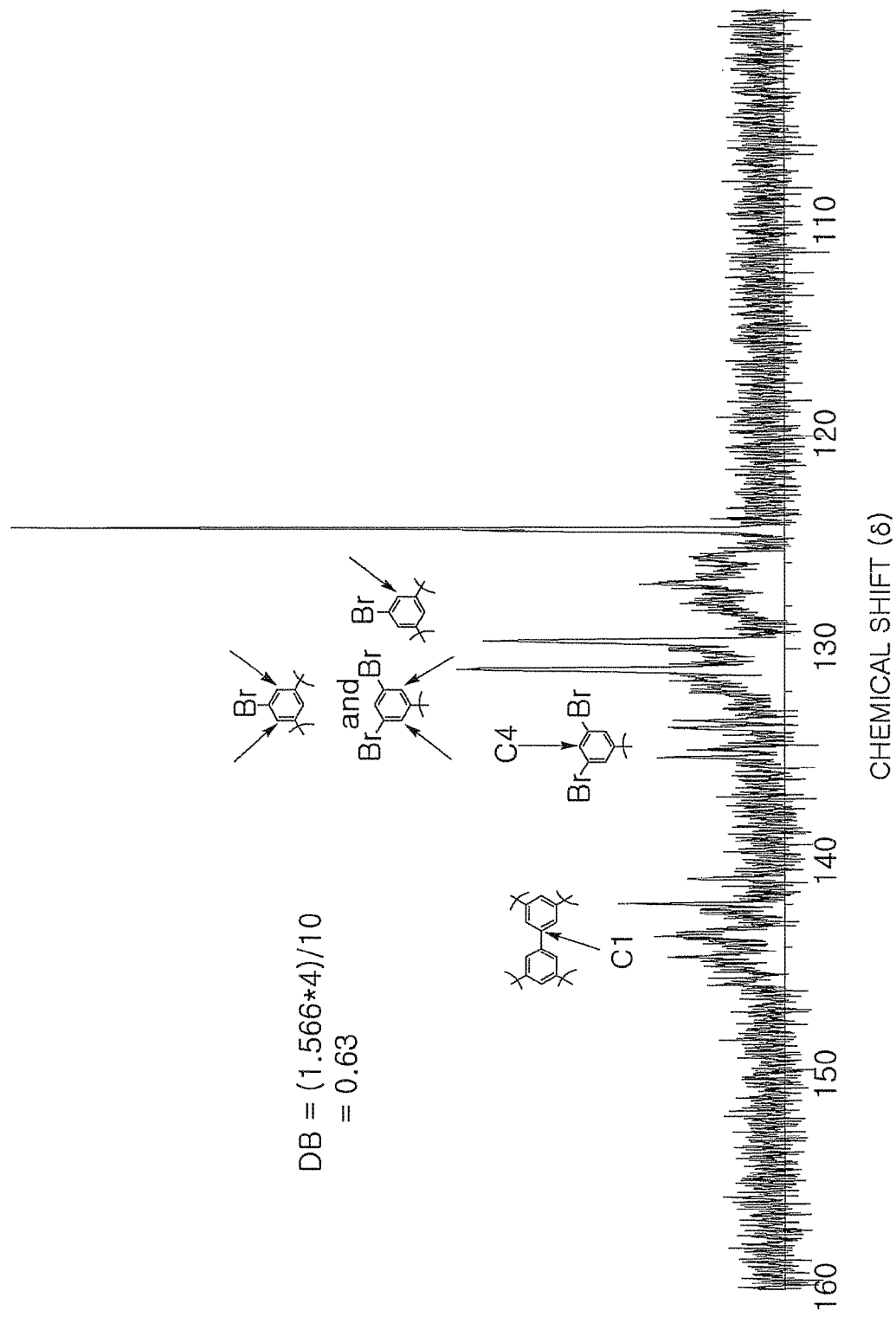
FIG. 1 is a $^{13}$C-nuclear magnetic resonance (NMR) spectrum of Compound A, which is obtained in Synthesis Example 1.

Reference will now be made in detail to the exemplary embodiments of the present teachings, examples of which are illustrated in the accompanying drawings, wherein like reference numerals refer to the like elements throughout. The exemplary embodiments are described below, in order to explain the aspects of the present teachings, by referring to the figures.

One or more exemplary embodiments may include a hyper-branched polymer that has a dendritic unit represented by Formula 1, a linear unit represented by Formula 2, a terminal unit represented by Formula 3, and a degree of branching of about 0.05 to about 1.

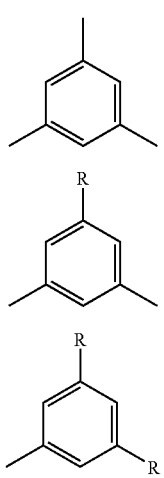

Formula 1

Formula 2

Formula 3

In formulae 1-3, R can be fluorine, a C1-C20 fluorinated alkyl group, a C6-C20 fluorinated aryl group, a C2-C20 fluorinated heteroaryl group, a C6-C20 cycloalkyl group, or a C2-C20 heterocycle group.

The degree of branching represents a ratio of a total number of the dendritic units and terminal units, to a total number of the dendritic units, linear units, and terminal units. For example, if the degree of branching is 0, it means that only the linear units exist. If the degree of branching is 1, it means that no linear units and no terminal units exist. The degree of branching may be calculated based on a ratio of integral values for the peaks of the nuclear magnetic resonance (NMR) spectra of the dendritic units, linear units, and terminal units.

The hyper-branched polymer, according to an exemplary embodiment of the present teachings, may be synthesized from a monomer in the form of $AB_2$ and may have the three types of repeating units, as described above, i.e., the dendritic units, linear units, and terminal units. The hyper-branched polymer may have a number average molecular weight of about 2,700 to about 4,000.

According to an exemplary embodiment of the present teachings, R may be fluorine, a trifluoromethyl group, a 3,5-difluorophenyl group, or one selected from the groups represented by the following formulae:

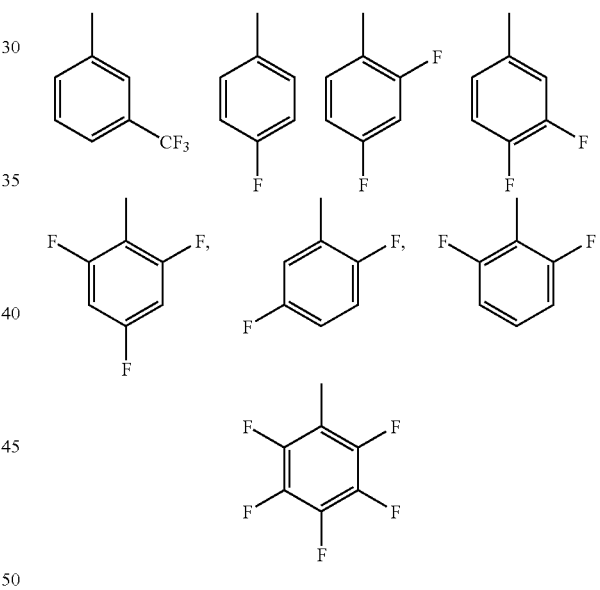

The degree of branching may be in the range of about 0.63 to about 0.7. The hyper-branched polymer may include a core unit that links with the dendritic unit, the linear unit, and the terminal unit. The core unit may be represented by Formula 4.

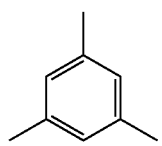

Formula 4

According to an exemplary embodiment of the present teachings, the hyper-branched polymer may be a compound represented by Formula 5.

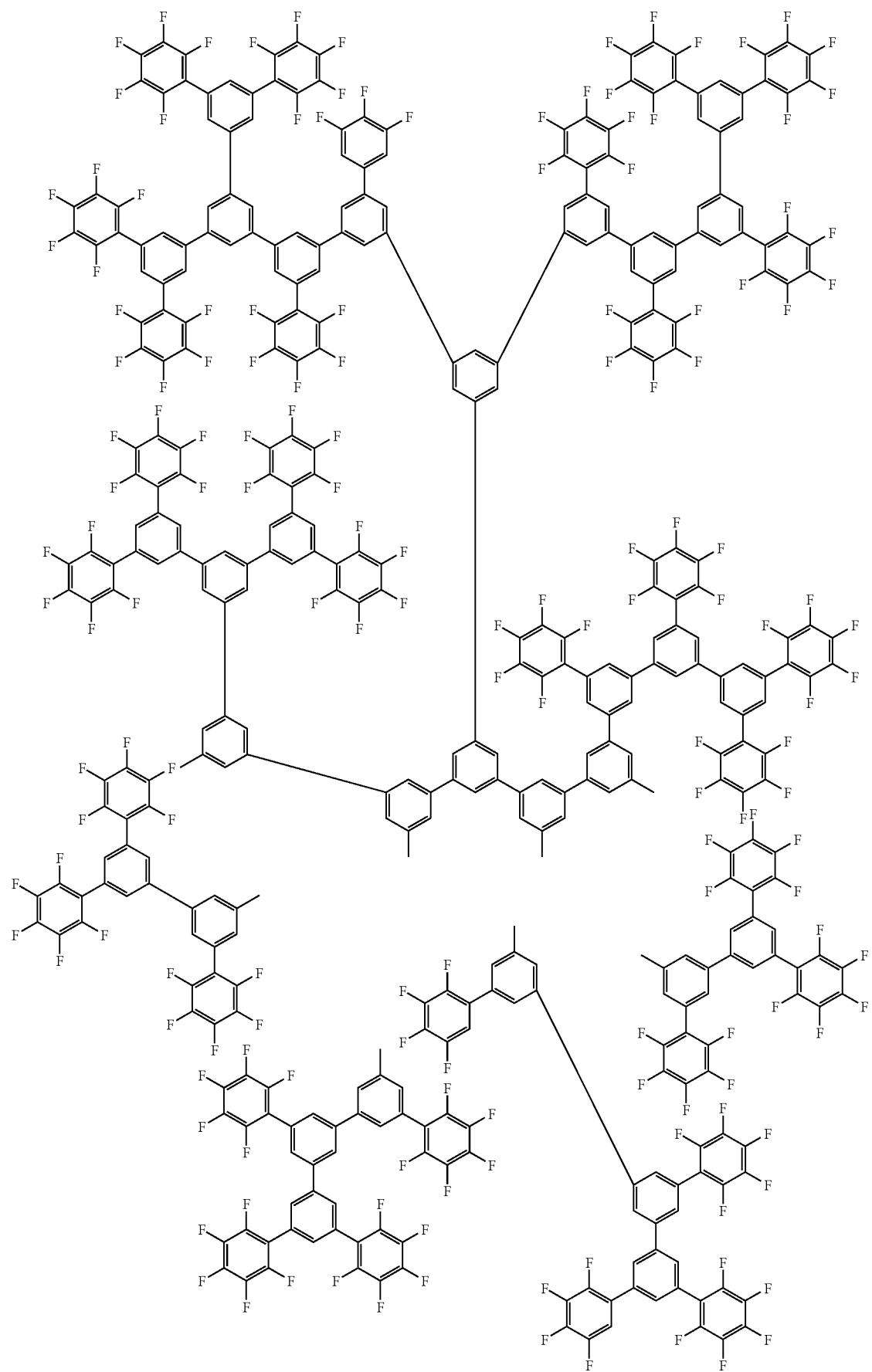
Formula 5

The compound represented by Formula 5 may have a degree of branching of about 0.63 to about 0.7, and may have a number average molecular weight of about 2,700 to about 4,000. The compound of Formula 5 may be referred to as a hyper-branched polyethylene polymer including fluorinated terminal units (HPPF).

According to an exemplary embodiment of the present teachings, the hyper-branched polymer may be prepared according to the following Reaction Scheme 1.

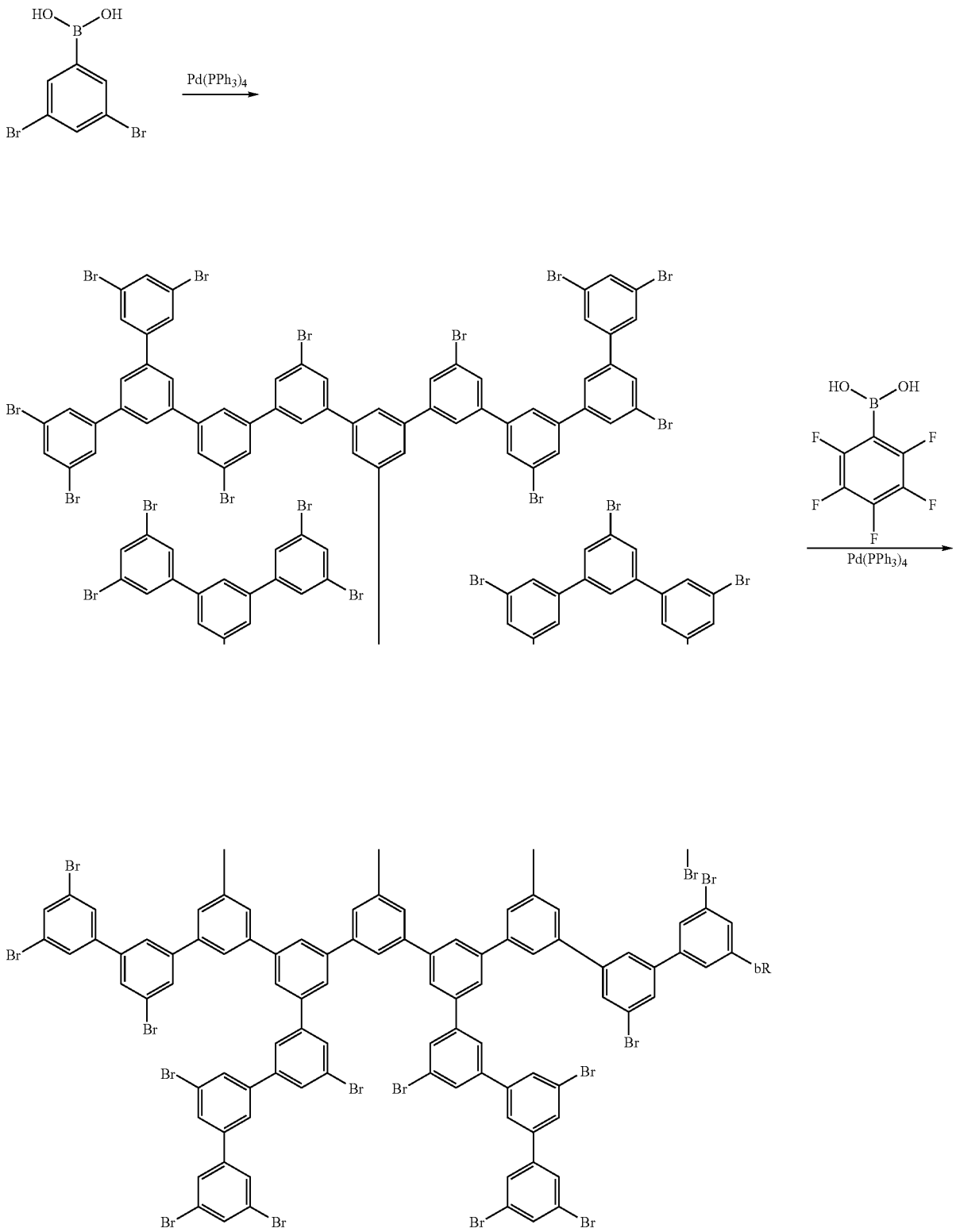

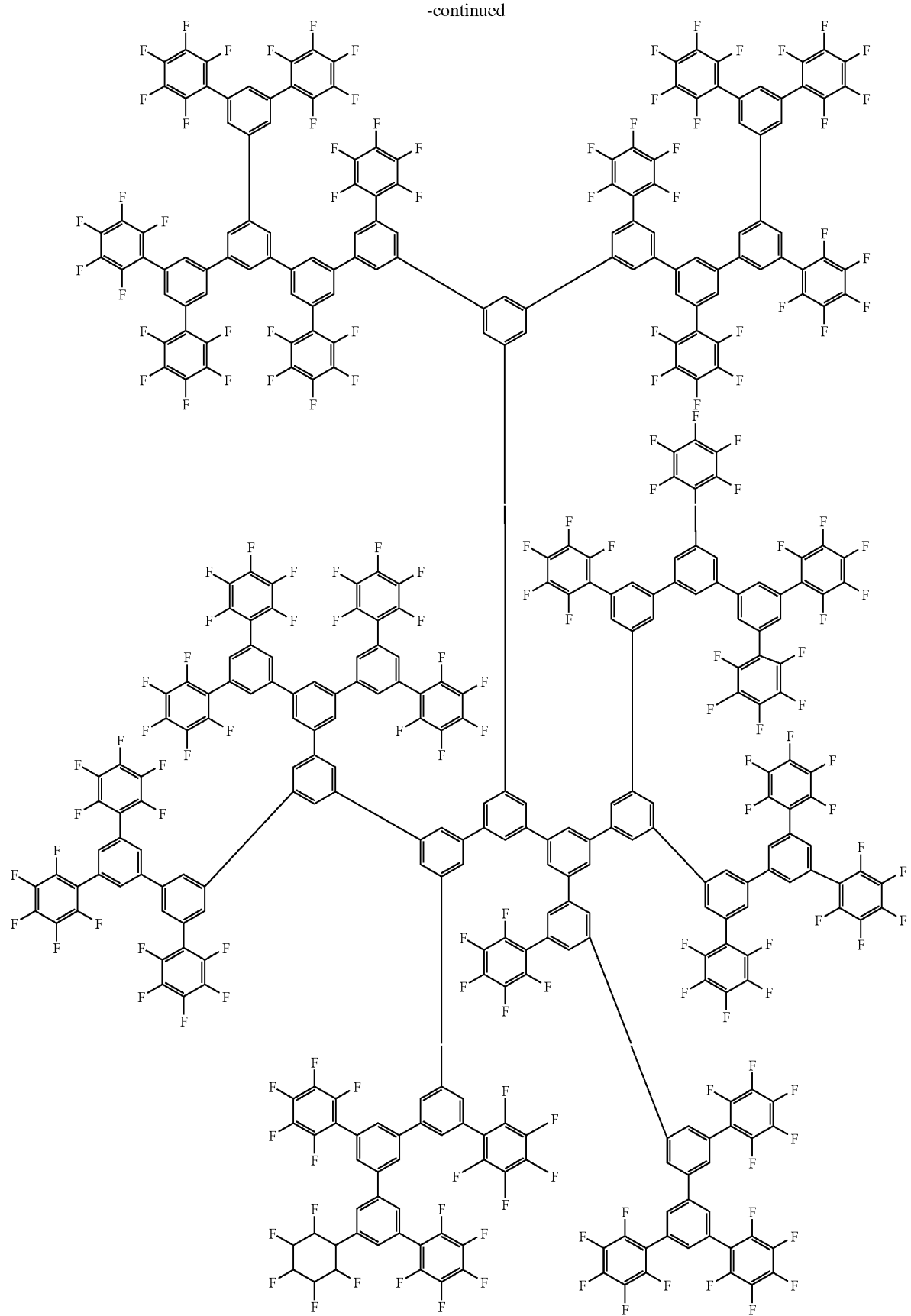

As illustrated in Reaction Scheme 1, initially compound A, which is a fluorinated polyphenylene in the form of $AB_2$, is obtained through the reaction of $(Pd(PPh_3)_4)$ (Ph being a phenyl group), a base, and a solvent, in 3,5-dibromoboronic acid. The solvent may be xylene, dimethylformamide, nitrobenzene, or the like, and the amount of the solvent may be in the range of about 1,500 to about 3,000 parts by weight, based on 100 parts by weight of the 3,5-dibromophenylboronic acid. If the amount of the solvent is not without this range, a desired reactivity may not be obtained.

The amount of the $Pd(PPh_3)_4$ may be in the range of about 0.003 moles to about 0.005 moles, based on 1 mole of 3,5-dibromoboronic acid. The base may be potassium carbonate ($K_2CO_3$), potassium hydroxide (KOH), or the like, and the amount of the base may be in the range of about 1.8 moles to about 2.0 moles, based on 1 mole of the 3,5-dibromoboronic acid. The reaction temperature may be in the range of about 140° C. to about 160° C.

The compound represented by Formula 5 may be obtained through a one-pot reaction, in which Suzuki coupling from compound A, a palladium catalyst, and pentafluorophenylboronic acid occurs. In more detail, the solvent is added to compound A, and the $Pd(PPh_3)_4$, the base, and the pentafluorophenylboronic acid are then added thereto, and mixed at 65-80° C.

The base may be potassium carbonate ($K_2CO_3$), potassium hydroxide (KOH), or the like. The amount of the base may be in the range of about 0.65 moles to about 0.8 moles, based on 1 mole of compound A.

The hyper-branched polymer of Formula 5, as prepared through the processes described above, may have a degree of branching of about 0.63 to about 0.7, and a number average molecular weight of about 2,700 to about 4,000. The degree of branching and the number average molecular weight of the hyper-branched polymer of Formula 5 may vary, according to the reaction temperature, reaction time, solvent condition, and the like.

The hyper-branched polymer may be a single macro-molecule, may be easy to synthesize, and may be produced on a large scale. The hyper-branched polymer includes fluorine or a fluorine functional group, and thus, has a high affinity for oxygen, thereby improving the oxygen permeability thereof. In addition, the hyper-branched polymer has improved heat resistance, durability, and phosphoric acid retention characteristics.

One or more exemplary embodiments may include an electrode for a fuel cell that includes a catalyst layer including the hyper-branched polymer and at least one catalyst. The hyper-branched polymer has excellent binding properties and thus, enables the electrode to be formed without a common binder. In addition, the hyper-branched polymer improves the performance of the electrode, while including a smaller loading amount of the catalyst in the catalyst layer, as compared to conventional electrodes.

The electrode contains the hyper-branched polymer and thus, has improved oxygen permeability and a reduced activation time. In addition, the electrode has excellent heat resistance and phosphoric acid resistance, which make it easier for the electrode to be wet with a doped phosphoric acid.

When the electrode includes the hyper-branched polymer of Formula 5, the oxygen permeability thereof is improved, even if air is supplied to the cathode. In addition, the wetability with phosphoric acid ($H_3PO_4$) and thermal stability thereof may be improved. Thus, a fuel cell, including the electrode and an electrolyte membrane, may operate in high-temperature, non-humidified conditions, and may provide improved thermal stability and power generation.

The amount of the hyper-branched polymer may be in the range of about 0.001 parts to about 0.65 parts by weight, for example, about 0.01 parts to about 0.05 parts by weight, based on 1 part by weight of the catalyst. If the amount of the hyper-branched polymer is less than about 0.001 parts by weight, the wetability and oxygen permeability of the electrode may not be significantly improved. On the other hand, if the amount of the hyper-branched polymer is greater than about 0.65 parts by weight, the electrode may be flooded.

The catalyst may be platinum (Pt), an alloy or a mixture of platinum and at least one metal selected from the group consisting of gold (Au), palladium (Pd), rhodium (Rh), iridium (Ir), ruthenium (Ru), tin (Sn), molybdenum (Mo), cobalt (Co), chromium (Cr), and any mixtures thereof. The Pt, the alloy, or the mixture may be supported on a carbonaceous support. For example, at least one catalyst selected from the group consisting of Pt, a PtCo alloy, a PtRu alloy, and any mixtures thereof, may be supported on a carbonaceous support.

The electrode may further include a binder conventionally used in the manufacture of an electrode for a fuel cell. The binder may be at least one selected from the group consisting of poly(vinylidenefluoride), polytetrafluoroethylene (PTFE), tetrafluoroethylene-hexafluoroethylene copolymer, fluorinated ethylene propylene (FEP), styrene butadiene rubber (SBR), polyurethane, a mixture thereof, or the like. When polyurethane is used as the binder, it may lead to excellent cell voltage characteristics.

The amount of the binder may be in the range of about 0.001 parts to about 0.5 parts by weight, based on 1 part by weight of the catalyst. If the amount of the binder is less than about 0.001 parts by weight, it may not significantly improve wettability of the electrode. On the other hand, if the amount of the binder is greater than about 0.5 parts by weight, it may trigger flooding of the electrode.

Figure 4:
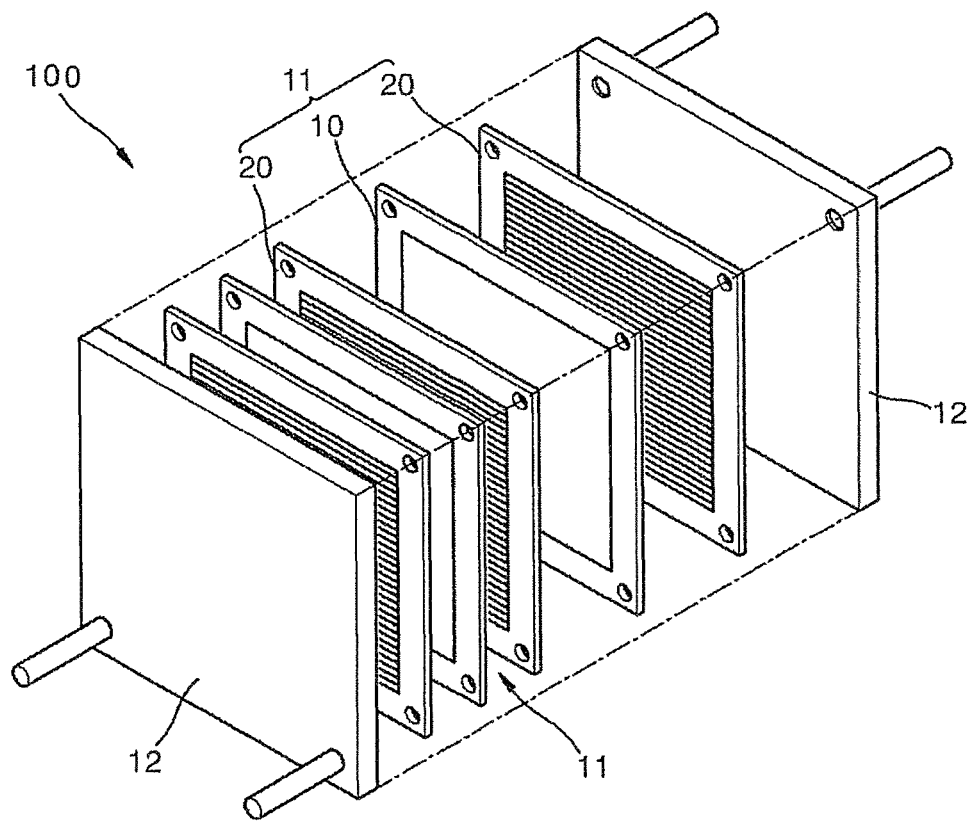
FIG. 4 is an exploded perspective view of a fuel cell according to an exemplary embodiment.
Figure 5:
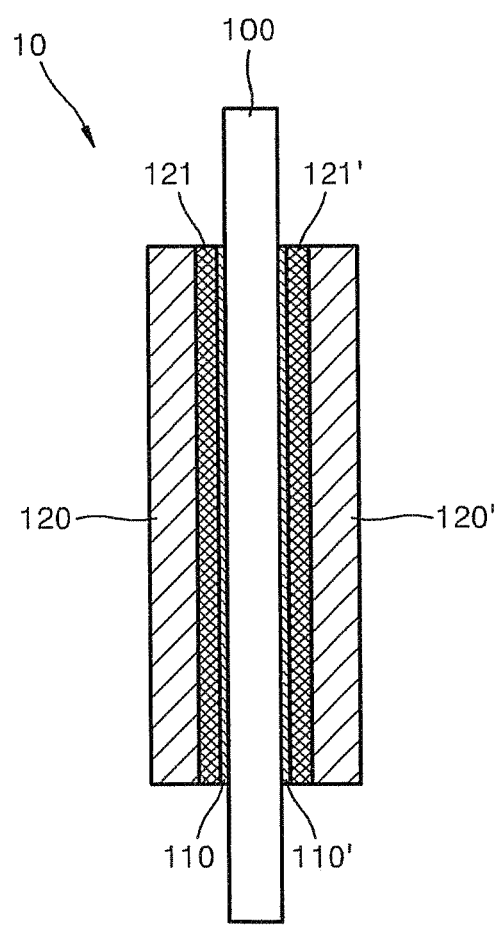
FIG. 5 is a cross-sectional view of a membrane-electrode assembly (MEA) of the fuel cell of FIG. 4.

FIG. 4 is an exploded perspective view of a fuel cell 100, according to an exemplary embodiment, and FIG. 5 is a cross-sectional view of a membrane-electrode assembly (MEA) 10 of the fuel cell 100. Referring to FIG. 4, the fuel cell includes two unit cells 11 disposed between a pair of holders 12. Each unit cell 11 includes an MEA 10 and bipolar plates 20 disposed on both sides of the MEA 10. The bipolar plates 20 are formed of a conductive metal, carbon, or the like, and are attached to the MEA 10, so that the bipolar plates 20 collect current and provide oxygen and fuel to the catalytic layers (110 and 110' in FIG. 7) of the MEA 10. The number of unit cells 11 present in the fuel cell 100 of FIG. 6 is two. However, the number of unit cells 11 is not limited to two and may be increased to several tens or hundreds, depending on the properties of the fuel cell 100.

Referring to FIG. 5, the MEA 10 includes an electrolyte membrane 100, catalytic layers 110 and 110' disposed on both sides of the MEA 100, first gas diffusion layers 121 and 121' respectively stacked on the catalytic layers 110 and 110', and second gas diffusion layers 120 and 120' respectively stacked on the first gas diffusion layers 121 and 121'.

The catalytic layers 110 and 110' are a fuel electrode and an oxygen electrode, respectively, each including at least one catalyst and the hyper-branched polymer, and may further include a material that may increase the electrochemical surface area thereof. The first gas diffusion layers 121 and 121' and the second gas diffusion layers 120 and 120' may each be formed of, for example, a carbon sheet or a carbon paper, and diffuse oxygen and fuel supplied through the bipolar plates 20 to the entire surfaces of the catalytic layers 110 and 110'.

The fuel cell 100 including the MEA 10 operates at a temperature of about 100 to about 300° C. Fuel, such as hydrogen, is supplied through one of the bipolar plates 20 into the catalytic layer 110, and an oxidant, such as oxygen, is supplied through the other bipolar plate 20 into the catalytic layer 110'. Then, hydrogen is oxidized in the catalytic layer 110, thereby producing protons. These protons are transferred through the electrolyte membrane 100 by conduction to reach the catalytic layer 110', and the protons and oxygen electrochemically react to produce water in the catalytic layer 110' and to produce electrical energy. Moreover, the hydrogen supplied as a fuel may be hydrogen produced by reforming hydrocarbons or alcohols, and the oxygen supplied as an oxidant may be supplied in the form of air.

A method of manufacturing an electrode for fuel cells, according to an exemplary embodiment of the present teachings, is as follows. First, a catalyst is dispersed in a solvent, to obtain a dispersion. The solvent may be N-methylpyrolidone (NMP), dimethylformamide (DMAc), or the like. The amount of the solvent may be in the range of about 1 part by weight to about 10 parts by weight, based on 1 part by weight of the catalyst.

The hyper-branched polymer, for example, the hyper-branched polymer of Formula 5 and/or a benzoxazine-based monomer (as described below), may be added to, and mixed with, the dispersion. A cross-linkable compound may be added, if necessary, to the mixture.

The resultant mixture is coated on the surface of a carbon support, to complete manufacture of the electrode. Herein, the carbon support may be fixed on a glass substrate to facilitate the coating. The coating method is not particularly limited. Examples of the coating method may include coating using a doctor blade, bar coating, screen printing, and the like.

The coated resultant is dried at a temperature in the range of about 20 to about 150° C., to remove the solvent. The drying time may vary according to the drying temperature, and may be in the range of about 10 to about 60 minutes. The drying may be performed at room temperature for 1 hour, at 60° C. for 15 minutes or longer, at 80° C. for 10 minutes or longer, and/or at 120° C. for 10 minutes or longer, for example.

The catalyst layer of the electrode may further include at least one proton conductor selected from a phosphoric acid and a C1-C20 organic phosphonic acid. The amount of the proton conductor may be in the range of about 10 parts to about 1,000 parts by weight, based on 100 parts by weight of the total weight of the electrode. In the case of using the phosphoric acid, an 85 wt % aqueous phosphoric acid solution may be used. The impregnation time of the phosphoric acid may be in the range of about 2.5 to about 14 hours, at 80° C.

An electrolyte membrane, according to an exemplary embodiment of the present teachings, can be used in a fuel cell including the electrode. The electrolyte membrane includes the hyper-branched polymer described above, or a cross-linked product of the hyper-branched polymer.

The electrolyte membrane reduces problems caused when an electrolyte membrane formed of polybenzimidazole alone is used, such as a pin-hole phenomenon caused by mechanical and chemical instability at high temperatures. In addition, the oxygen permeability of the electrode increases, and the amount of dissolved oxygen in the electrode increases, resulting in a reduction in the activation time of the electrode.

A fuel cell according to an exemplary embodiment of the present teachings, may include a conventional electrolyte membrane, for example, a polybenzimidazole electrolyte membrane, a polybenzoxazine-polybenzimidazole copolymer electrolyte membrane, a porous polytetrafluoroethylene (PTFE) membrane, or the like. Alternatively, the electrolyte membrane according to the present teachings may be used, which decreases the contact resistance of, and increases the performance of, the fuel cell.

A method of forming an electrolyte membrane, according to an exemplary embodiment of the present teachings, may involve blending the hyper-branched polymer, a benzoxazine-based monomer represented by the following Formula 6, and a cross-linkable compound, such as polybenzimidazole. The resultant mixture is then cured at 50 to 250° C., for example, at 80 to 220° C. Subsequently, the resultant is impregnated with a proton conductor, such as an acid, to form the electrolyte membrane.

Formula 6

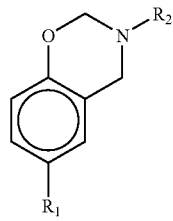

In Formula 6, $R_1$ is hydrogen, a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C2-C20 heteroaryl group, a substituted or unsubstituted C4-C20 cycloalkyl group, a substituted or unsubstituted C2-C20 heterocycle group, a halogen atom, a hydroxyl group, or a cyano group; and $R_2$ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C4-C20 carbocycle group, a substituted or unsubstituted C4-C20 carbocyclic alkyl group, a substituted or unsubstituted C2-C20 heterocycle group, or a substituted or unsubstituted C2-C20 heterocyclicalkyl group.

The benzoxazine-based monomer represented by Formula 6 may include compounds represented by the following Formulae 7 through 16.

Formula 7

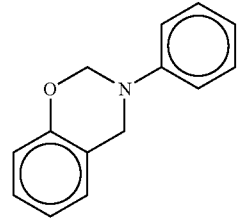

Formula 8

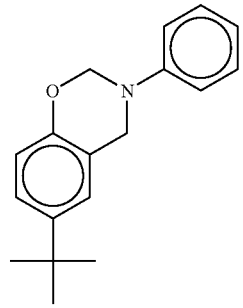

Formula 9
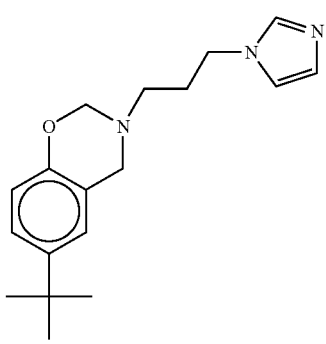

Formula 10
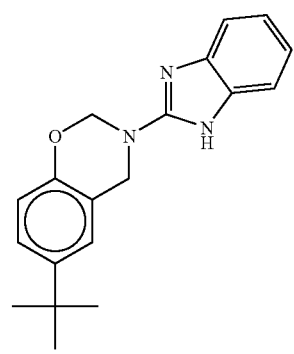

Formula 11
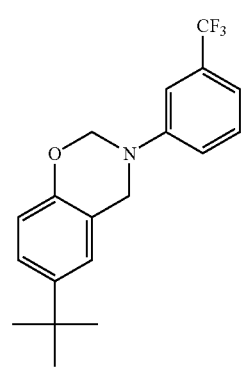

Formula 12
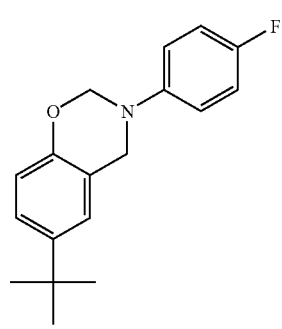

Formula 13
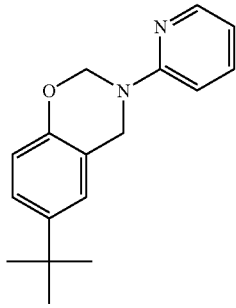

Formula 14
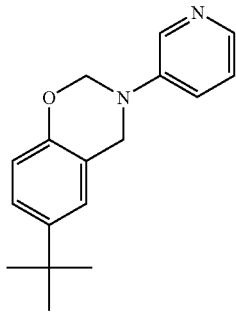

Formula 15
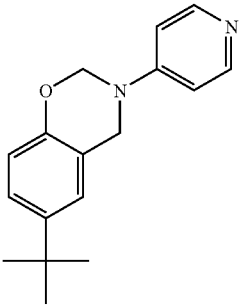

Formula 16

The cross-linkable compound may be at least one selected from polybenzimidazoles (PBI), polybenzothiazoles, polybenzoxazoles, and polyimides. The amount of the cross-linkable compound may be in the range of about 5 parts to about 95 parts by weight, based on 100 parts by weight of the hyper-branched polymer and the benzoxazine-based monomer.

If the amount of the cross-linkable compound is less than about 5 parts by weight, the amount of phosphoric acid impregnated may be insufficient. On the other hand, if the amount of the cross-linkable compound is greater than about 95 parts by weight, the resulting cross-linked product may be dissolved, due to an excess of phosphoric acid.

Alternatively, when forming the electrolyte membrane using the mixture of the hyper-branched polymer, the benzoxazine-based monomer of Formula 6, and the cross-linkable compound, a tape coating method or a common coating method may be used. An example of the common coating method may be a method in which the mixture is cast on a support using a doctor blade. Herein, a doctor blade with a 250 to 500 μm gap is used. When the casting method using a doctor blade is used, the process of forming the electrolyte membrane may further include separating the electrolyte membrane from the support, after curing and before impregnating with an acid. When separating the electrolyte membrane from the support, the mixture is immersed in distilled water, at a temperature range of about 60 to about 80° C.

The support may be any suitable support, for example, a glass substrate, a polyimide film, and the like. When the tape casting method is used, a tape-cast membrane is separated from a support, such as polyethyleneterephthalate, before being cured, and is then put into an oven for curing. Thus, the process of removing the support after curing is unnecessary.

In addition, when the electrolyte membrane is formed using the mixture of the hyper-branched polymer, the benzoxazine-based monomer, and polybenzimidazol, by the tape casting method, a process of filtering the mixture may be further performed. The tape-cast membrane is thermally treated to induce a curing reaction, and then impregnated with a proton conductor, such as an acid, to complete formation of the electrolyte membrane.

A method of manufacturing a membrane-electrode assembly (MEA) for a fuel cell, according to an exemplary embodiment of the present teachings, is as follows. The term "membrane-electrode assembly" refers to a structure in which an electrolyte membrane is disposed between two electrodes, each electrode including a catalyst layer and a diffusion layer.

The MEA may be formed by positioning the electrodes on opposite sides of the electrolyte membrane, joining them all together at a high temperature and high pressure, and then joining a diffusion layer (fuel diffusion layer) to each of the catalyst layers. The joining may be performed under a pressure of about 0.1 to about 3 ton/cm$^2$, and in particular about 1 ton/cm$^2$, at a temperature that softens the electrolyte membrane. Next, a bipolar plate is installed on both sides of the MEA, to complete the fuel cell. The bipolar plate has pores to supply a fuel, and acts as a current collector.

The fuel cell may be used as a polymer electrolyte membrane fuel cell (PEMFC). Substituents in the formulae above may be defined as follows.

The aryl group in the formulae above may be used alone or in combination, and refers to a C6-C20 carbocyclic aromatic system containing at least one ring, wherein the rings may be attached to each other using a pedant method, or fused with each other. The term "aryl" refers to an aromatic radical, including a phenyl, a naphthyl, a tetrahydronaphthyl, or the like. The aryl group may have a substituent, such as a haloalkylene, a nitro, a alkoxy, and a lower alkylamino. At least one hydrogen atom of the aryl group may be substituted with the same substituent as in the alkyl group, as described above.

The heteroaryl group in the formulae above refers to a monocyclic or bicyclic aromatic organic compound, which contains 1, 2, or 3 heteroatoms selected from the group consisting of N, O, P, S, and any mixtures thereof, and has 1 to 20 carbon atoms. At least one hydrogen atom of the heteroaryl group may be substituted with the same substituent as in the aryl group.

The alkyl group in the formulae above may be a methyl, an ethyl, a propyl, an isobutyl, a sec-butyl, a pentyl, an iso-amyl, a hexyl, or the like. At least one hydrogen atom of the alkyl group may be substituted with the same substituent as in the aryl group.

The heterocycle group in the formulae above refers to a 5 to 10 membered ring containing a heteroatom, such as nitrogen, sulfur, phosphorus, oxygen, and the like. At least one hydrogen atom of the heterocycle group may be substituted with the same substituent as in the aryl group.

The cycloalkyl group in the formulae above may be a C6-C20 carbocyclic group. At least one hydrogen atom of the cycloalkyl group may be substituted with the same substituent as in the aryl group.

One or more exemplary embodiments include an electrode for fuel cells having a reduced activation time, due to a higher oxygen affinity, and an improved cell voltage with respect to current density. The electrode also exhibits improved durability and stability at high temperatures. One or more exemplary embodiments include an electrolyte membrane that exhibits excellent stability at high temperatures, and improved acid retention.

Hereinafter, the present teachings will be described more specifically, with reference to the following examples. The following examples are for illustrative purposes only and are not intended to limit the scope of the present teachings.

Synthesis Example 1

Preparation of Compound A and HPPF of Formula 5

A solution of 4 g of 3,5-dibromophenylboronic acid dissolved in ethanol was put into a reactor containing xylene, a 1M aqueous K$_2$CO$_3$ solution, and Pd(PPh$_3$)$_4$ (Ph is a phenyl). Next, the resultant reaction mixture was refluxed for 12 hours.

The reaction mixture was cooled to room temperature, and a reaction product was precipitated using hexane, to obtain a precipitate. The precipitate was washed with methanol, water, and then methanol. Then, the resultant was dried in an oven, to obtain Compound A.

2 g of Compound A and 4 g of pentafluoroboronic acid were dissolved in tetrahydrofurane (THT). Then 10 ml of a 2M aqueous K$_2$CO$_3$ solution was added to the resultant solution. The resultant was subject to degassing for 30 minutes, and then 0.8 g of Pd(PPh$_3$)$_4$ (Ph=phenyl) was added thereto, and mixed.

The reaction mixture was cooled to room temperature, and the reaction product was precipitated using hexane, to obtain a precipitate. The precipitate was washed with methanol, water, and then methanol. The resulting product was vacuum-dried in an oven, to yield a HPPF represented by Formula 5.

Figure 2:
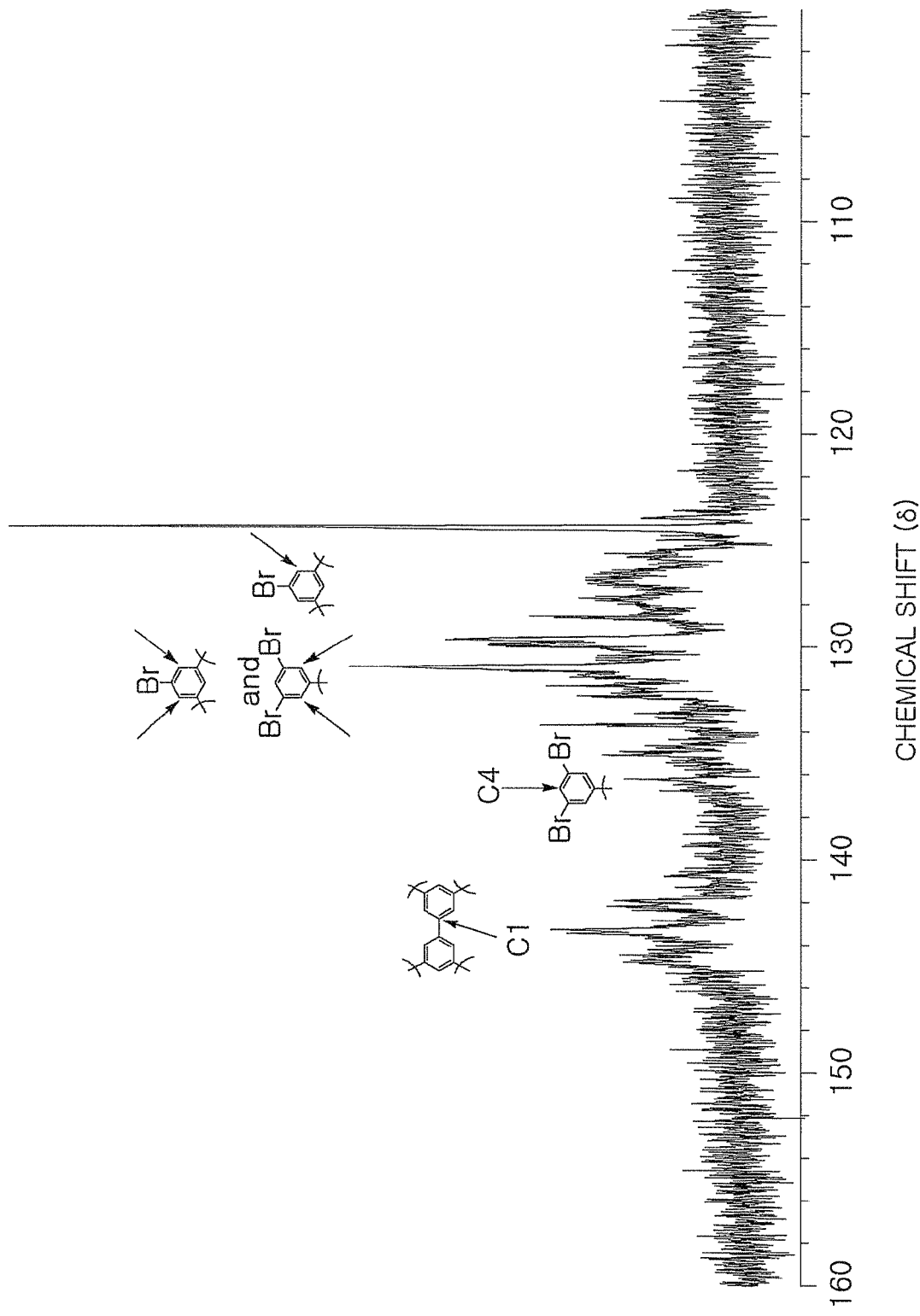
FIG. 2 is a $^{13}$C-NMR spectrum of hyper-branched polyethylene polymer including fluorinated terminal units (HPPF) obtained in Synthesis Example 1.

The structures of Compound A and the HPPF of Formula 5 were identified using a nuclear magnetic resonance (NMR) analysis ($^{13}$C NMR). The results are shown in FIGS. 1 and 2. An analyzer used for the NMR analysis was a Bruker NMR 500 MHz (Model name: Avance 500), which is commercially available from Bruker Biospin.

The degree of branching of HPPF was about 0.63. The molecular weights of the HPPF obtained in Synthesis Example 1 were measured using gel permeation chromatography (GPC). The HPPF had a number average molecular weight of about 4,000.

The molecular weights of the HPPF obtained in Synthesis Example 1 were measured using GPC. The results are shown in Table 1.

TABLE 1

| Items | Mn | Mw | Mw/Mn |
|---|---|---|---|
| Compound A | 2,563 | 11,547 | 4.50 |
| HPPF | 4,013 | 17,521 | 4.37 |

In Table 1, Mn represents the number average molecular weight, and Mw represents the weight average molecular weight.

Example 1

Manufacture of Electrodes for Fuel Cells and a Fuel Cell Including the Electrodes 1 g of a catalyst, in which 50 wt % of PtCo was supported on carbon, and 3 g of NMP were put into a stirrer, and the mixture was stirred, to prepare a slurry. A solution of the HPPF of Synthesis Example 1 in N-methylpyrolidone (NMP), was added to the slurry, to make the resultant contain 0.025 g of the HPPF. The resultant was further stirred.

Subsequently, a solution of 5 wt % of polyvinylidene fluoride in NMP was added to the resultant, to make the resultant contain 0.025 g of polyvinylidene fluoride. The resultant was mixed for 10 minutes, to prepare a slurry.

Carbon paper was cut to a size of 4×7 cm$^2$, fixed on a glass plate, and coated with the slurry, using a doctor blade (Sheen Instruments Ltd.) having a gap of to 600 μm. The resultant was dried at room temperature for 1 hour, dried at 80° C. for 1 hour, dried at 120° C. for 30 minutes, and dried at 150° C. for 15 minutes, to manufacture a cathode (fuel electrode).

An anode was manufactured according to the following processes. 2 g of a catalyst having 50 wt % of Pt supported on carbon and 9 g of NMP as a solvent were put into a stirrer, and the mixture was stirred for 2 minutes at a high-speed.

Subsequently, a solution of 0.05 g of polyvinylidene fluoride dissolved in 1 g of NMP was added to the mixture, and the resultant was further stirred for 2 minutes, to prepare a slurry. The slurry was coated on carbon paper, which was coated with a microporous layer, using a bar coater, to complete manufacture of the anode.

Separately, 60 parts by weight of a benzoxazine-based monomer A represented by the following formula, 3 parts by weight of a benzoxazine-based monomer B represented by the following formula, and 37 parts by weight of polybenzimidazole were blended together, and then cured at about 220° C.

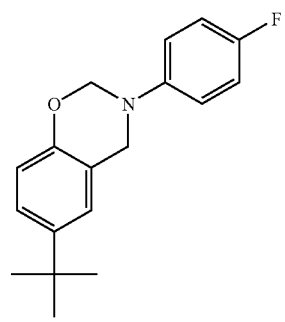

benzoxazine-based monomer A

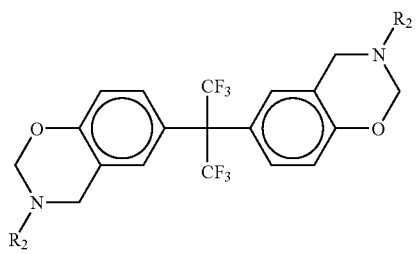

benzoxazine-based monomer B ($R_2$ = phenyl)

Subsequently, the resultant was impregnated with 85 wt % of phosphoric acid at 80° C., for over 4 hours, to form an electrolyte membrane. Herein, the amount of phosphoric acid was about 480 parts by weight, based on 100 parts by weight of the electrolyte membrane. The electrolyte membrane was disposed between the cathode and the anode, to manufacture an MEA. The cathode and the anode were not impregnated with phosphoric acid.

To prevent gas permeation between the cathode and the anode, a TEFLON membrane main gasket having a thickness of 200 μm and a TEFLON membrane sub-gasket having a thickness of 20 μm were joined and disposed between the electrode and the electrolyte membrane. Then, the MEA was assembled, by the stepwise application of 1, 2, and 3 N-m of torque.

Electricity was generated, supplying hydrogen to the anode (flowrate: 100 ccm) and air to the cathode (flowrate: 250 ccm), at 150° C., without humidifying the electrolyte membrane, and properties of the fuel cell prepared were measured. Herein, an electrolyte doped with phosphoric acid was used, and thus, the performance of the fuel cell improved over time. Thus, aging was performed until an operating voltage reached a peak voltage, and then the properties of the fuel cell were finally evaluated. In addition, the surface areas of the cathode and the anode were fixed to 2.8×2.8 (7.84 cm$^2$). The thickness of the cathode was about 430 μm, and the thickness of the anode was about 390 μm.

Example 2

Manufacture of Electrodes for Fuel Cells and a Fuel Cell Including the Electrodes Electrodes and a fuel cell including the electrodes were manufactured in the same manner as in Example 1, except that polyurethane, instead of the polyvinylidene fluoride, was used to manufacture the cathode.

Comparative Example 1

Manufacture of Electrodes for Fuel Cells and a Fuel Cell Including the Electrodes Electrodes and a fuel cell including the electrodes were manufactured in the same manner as in Example 1, except that the HPPF of Synthesis Example 1 was not added, when the cathode was manufactured.

Figure 3:
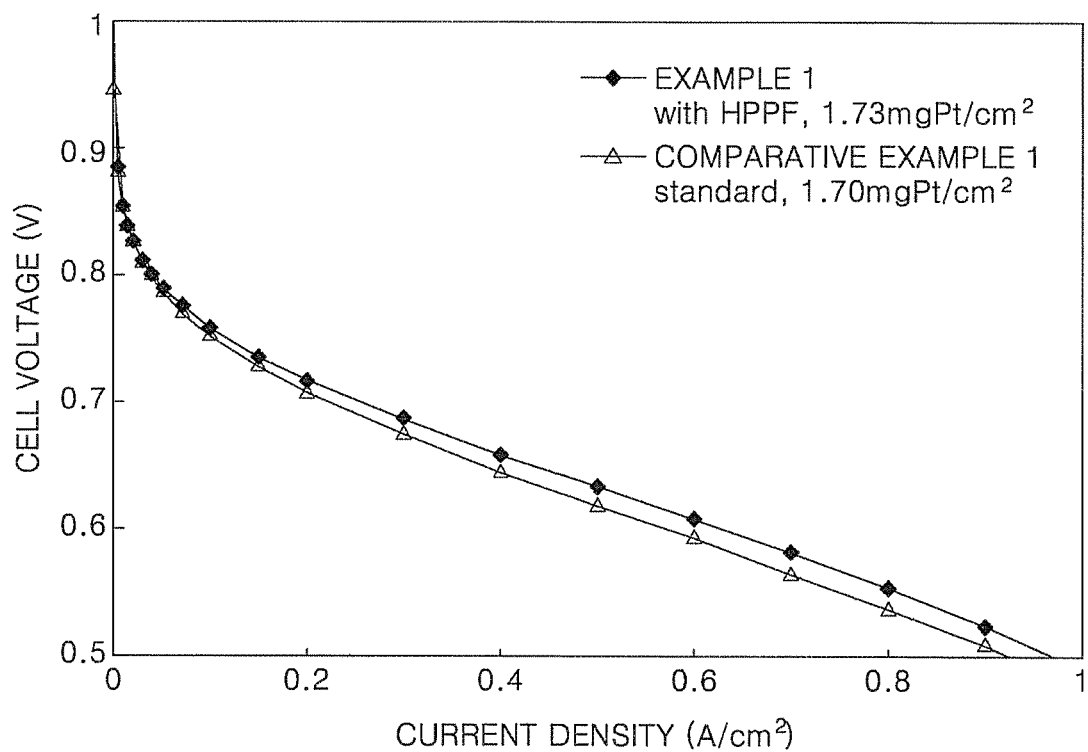
FIG. 3 is a graph of voltage with respect to current density of fuel cells manufactured according to Example 1 and Comparative Example 1.

Cell voltages with respect to current density, in the fuel cells manufactured according to Example 1 and Comparative Example 1, were measured. The results are shown in FIG. 3. Referring to FIG. 3, it can be seen that the cell voltage characteristics were improved in the fuel cell of Example 1, as compared to Comparative Example 1.

Although a few exemplary embodiments of the present teachings have been shown and described, it would be appreciated by those skilled in the art that changes may be made in these exemplary embodiments, without departing from the principles and spirit of the present teachings, the scope of which is defined in the claims and their equivalents.

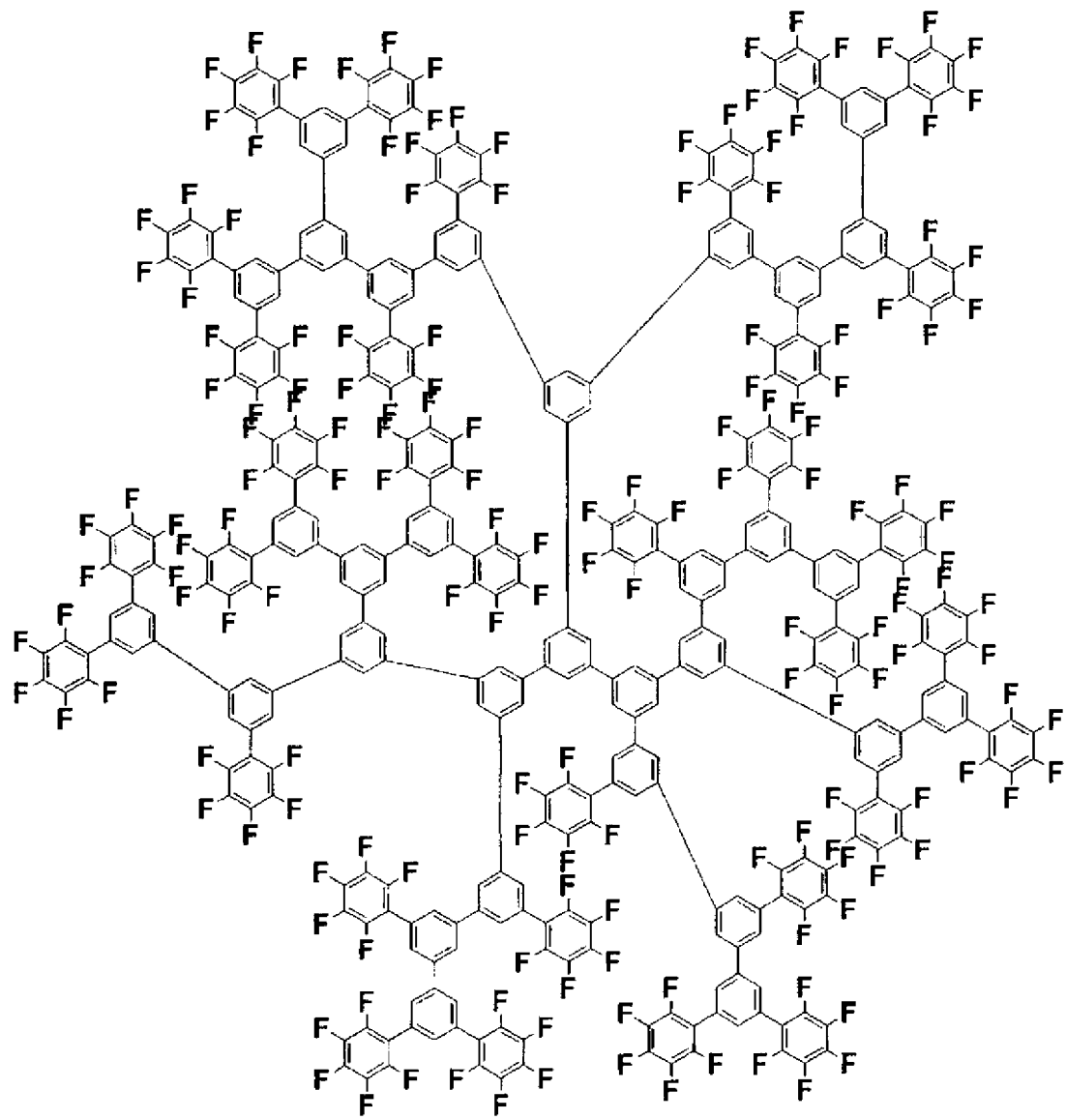

What is claimed is:

1. An electrode, comprising a catalyst layer comprising a hyper-branched polymer having:
   a dendritic unit represented by Formula 1;
   a linear unit represented by Formula 2;
   a terminal unit represented by Formula 3; and
   a degree of branching of from about 0.05 to about 1,

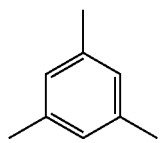

Formula 1

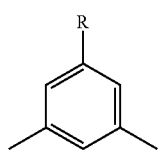

Formula 2

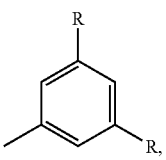

Formula 3 wherein R is selected from the group consisting of fluorine, a C1-C20 fluorinated alkyl group, a C6-C20 fluorinated aryl group, a C2-C20 fluorinated heteroaryl group, a C6-C20 cycloalkyl group, and a C2-C20 heterocycle group.

2. The electrode of claim 1, wherein R is selected from the group consisting of fluorine, a trifluoromethyl group, a 3,5-difluorophenyl group, or a group represented by one of the following formulae:

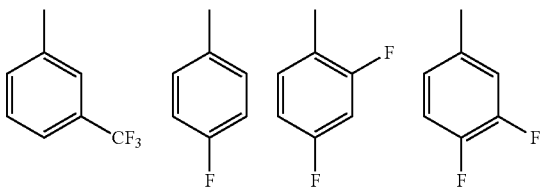

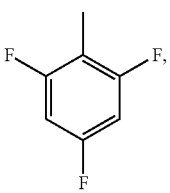 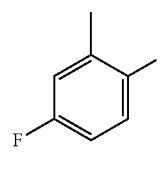 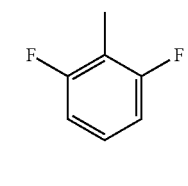

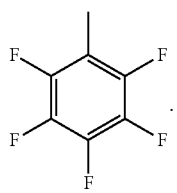

3. The electrode of claim 1, wherein the hyper-branched polymer has a degree of branching of from about 0.63 to about 0.7.

4. The electrode of claim 1, wherein the hyper-branched polymer is a compound represented by Formula 5 and has a degree of branching of from about 0.63 to about 0.7:

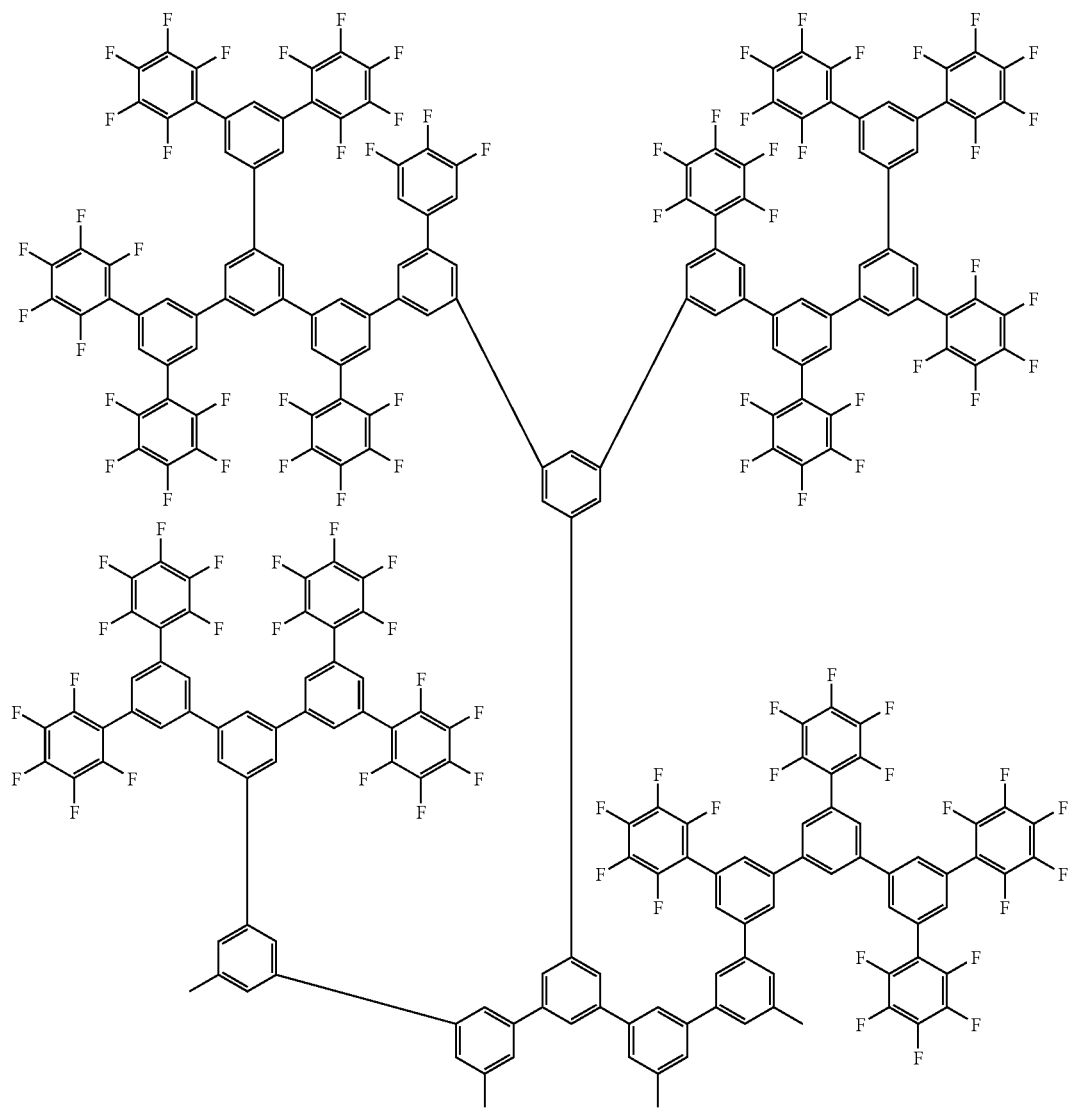
Formula 5

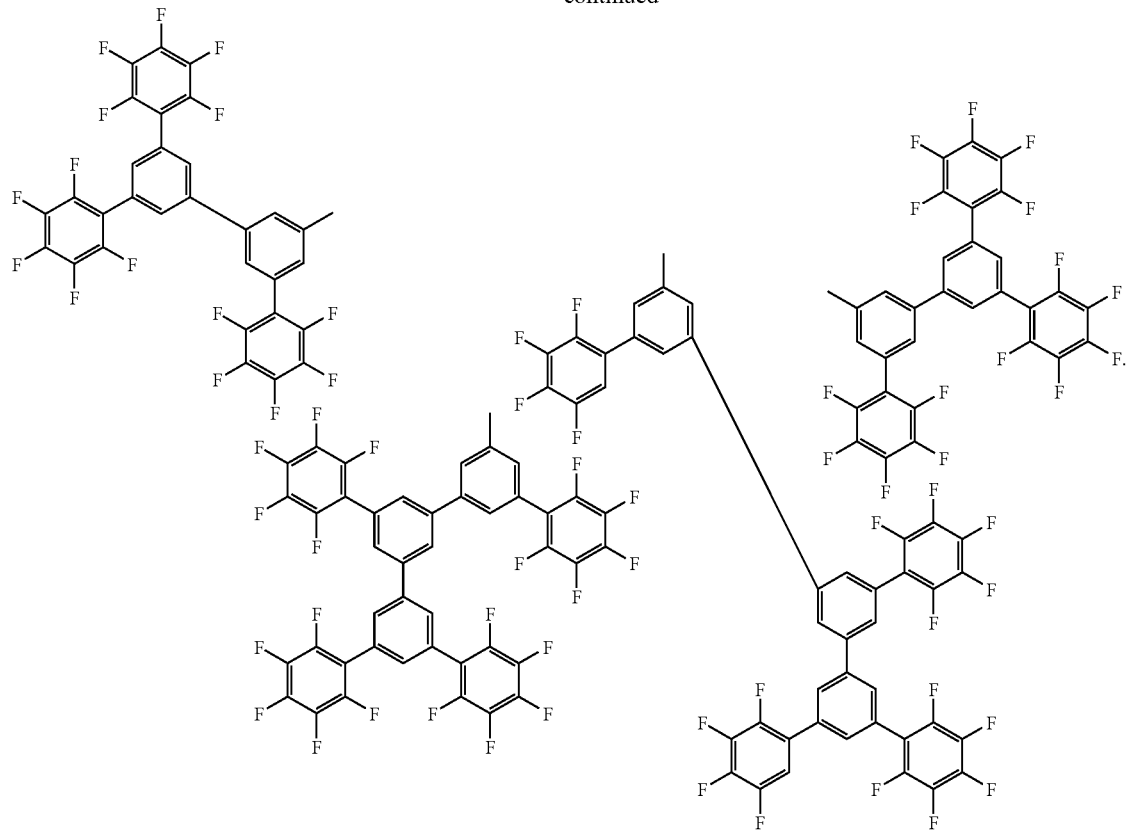

5. The electrode of claim 1, wherein the catalyst layer comprises a catalyst.

6. The electrode of claim 1, wherein:
the catalyst layer comprises a catalyst; and
the amount of the hyper-branched polymer is in the range of about 0.001 to about 0.65 parts by weight, based on 1 part by weight of the catalyst.

7. The electrode of claim 1, wherein the catalyst layer comprises:
platinum (Pt); or
an alloy or mixture of platinum and at least one metal selected from the group consisting of gold, palladium, rhodium, iridium, ruthenium, tin, molybdenum, cobalt, chrome, and any mixtures thereof.

8. The electrode of claim 7, wherein the catalyst layer further comprises a carbonaceous support to support the platinum, the platinum alloy, or the mixture.

9. The electrode of claim 1, wherein the catalyst layer comprises at least one proton conductor selected from a phosphoric acid and a C1-C20 organic phosphonic acid.

10. The electrode of claim 9, further comprising at least one binder selected from the group consisting of poly(vinylidenefluoride), polytetrafluoroethylene (PTFE), tetrafluoroethylene-hexafluoroethylene copolymer, fluorinated ethylene propylene (FEP), styrene butadiene rubber (SBR), polyurethane, and a mixture thereof.

11. The electrode of claim 10, wherein the amount of the binder is in the range of about 0.001 parts to about 0.5 parts by weight based on 1 part by weight of a catalyst of the catalyst layer.

12. The electrode of claim 1, wherein the catalyst layer comprises a catalyst and a polyurethane binder.

13. An electrode comprising a catalyst layer comprising a cross-linked product of a hyper-branched polymer, a benzoxazine-based monomer, and a cross-linkable compound, the hyper-branched polymer having:
a dendritic unit represented by Formula 1;
a linear unit represented by Formula 2;
a terminal unit represented by Formula 3; and
a degree of branching of about 0.05 to about 1,

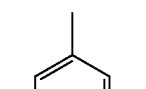

Formula 1

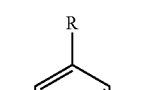

Formula 2

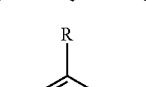

Formula 3 wherein R is selected from the group consisting of fluorine, a C1-C20 fluorinated alkyl group, a C6-C20 fluorinated aryl group, a C2-C20 fluorinated heteroaryl group, a C6-C20 cycloalkyl group, and a C2-C20 heterocycle group.

14. The electrode of claim 13, wherein the catalyst layer comprises a catalyst.

15. The electrode of claim 13, wherein:
the catalyst layer comprises a catalyst; and
the amount of the hyper-branched polymer is in the range of from about 0.001 to about 0.65 parts by weight, based on 1 part by weight of the catalyst.

16. The electrode of claim 13, wherein the catalyst layer comprises:
platinum (Pt); or
an alloy or mixture of platinum and at least one metal selected from the group consisting of gold, palladium, rhodium, iridium, ruthenium, tin, molybdenum, cobalt, chrome, and a mixture thereof.

17. The electrode of claim 16, wherein the catalyst layer further comprises a carbonaceous support to support the platinum, the platinum alloy, or the mixture.

18. The electrode of claim 13, wherein the catalyst layer comprises at least one proton conductor selected from a phosphoric acid and a C1-C20 organic phosphonic acid.

19. The electrode of claim 13, further comprising at least one binder selected from the group consisting of poly(vinylidenefluoride), polytetrafluoroethylene (PTFE), tetrafluoroethylene-hexafluoroethylene copolymer, fluorinated ethylene propylene (FEP), styrene butadiene rubber (SBR), polyurethane, and a mixture thereof.

20. The electrode of claim 19, wherein the amount of the binder is in the range of from about 0.001 parts to about 0.5 parts by weight, based on 1 part by weight of a catalyst of the catalyst layer.

21. The electrode of claim 13, wherein the catalyst layer further comprises a catalyst and a polyurethane binder.

22. An electrolyte membrane for fuel cells, comprising:
a hyper-branched polymer that has a dendritic unit represented by Formula 1, a linear unit represented by Formula 2, and a terminal unit represented by Formula 3 and that has a degree of branching of about 0.05 to about 1; or
a cross-linked product of the hyper-branched polymer, a benzoxazine-based monomer, and a cross-linkable compound,

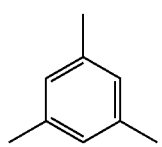

Formula 1

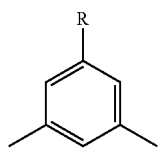

Formula 2

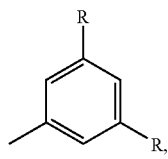

Formula 3 wherein R is selected from the group consisting of fluorine, a C1-C20 fluorinated alkyl group, a C6-C20 fluorinated aryl group, a C2-C20 fluorinated heteroaryl group, a C6-C20 cycloalkyl group, and a C2-C20 heterocycle group.

23. The electrolyte membrane of claim 22, further comprising at least one proton conductor selected from a phosphoric acid and a C1-C20 organic phosphonic acid.

24. A fuel cell comprising:
a cathode;
an anode; and
a polymer electrolyte membrane interposed between the cathode and the anode,
wherein at least one of the cathode, the anode, and the electrolyte membrane comprises,
a hyper-branched polymer that has a dendritic unit represented by Formula 1, a linear unit represented by Formula 2, a terminal unit represented by Formula 3, and a degree of branching of about 0.05 to about 1, or
a cross-linked product of the hyper-branched polymer, a benzoxazine-based monomer, and a cross-linkable compound,

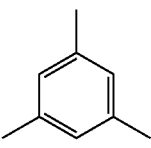

Formula 1

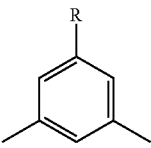

Formula 2

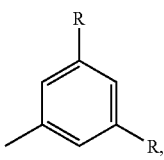

Formula 3 wherein R is selected from the group consisting of fluorine, a C1-C20 fluorinated alkyl group, a C6-C20 fluorinated aryl group, a C2-C20 fluorinated heteroaryl group, a C6-C20 cycloalkyl group, or a C2-C20 heterocycle group.

* * * * *

UNITED STATES PATENT AND TRADEMARK OFFICE
CERTIFICATE OF CORRECTION

PATENT NO. : 8,628,895 B2  
APPLICATION NO. : 12/637073  
DATED : January 14, 2014  
INVENTOR(S) : Seong-woo Choi et al.

Page 1 of 4

It is certified that error appears in the above-identified patent and that said Letters Patent is hereby corrected as shown below:

In the Specification  
Columns 5 and 6, Formula 5 should read as shown below.

Formula 5

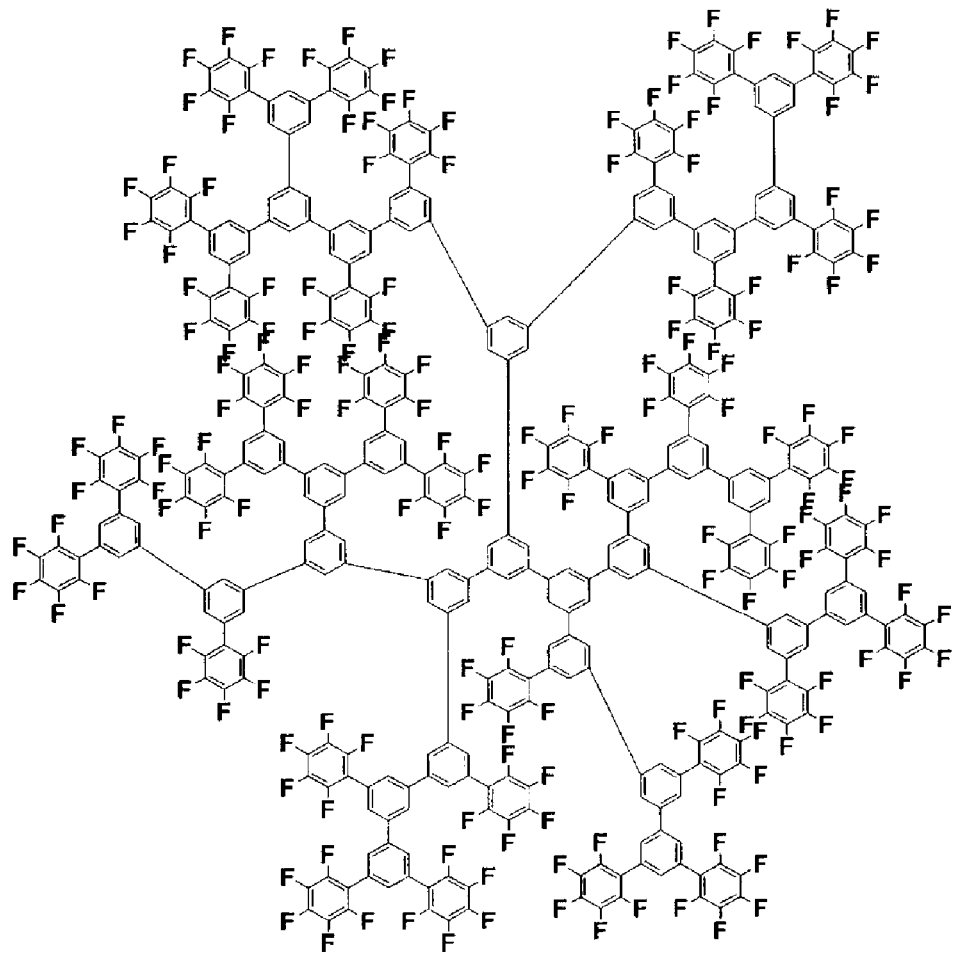

Signed and Sealed this  
Twenty-fifth Day of August, 2015

Michelle K. Lee  
*Director of the United States Patent and Trademark Office*

CERTIFICATE OF CORRECTION (continued)

U.S. Pat. No. 8,628,895 B2

Columns 7 and 8, Reaction Scheme 1 should read as shown below.

Reaction Scheme 1

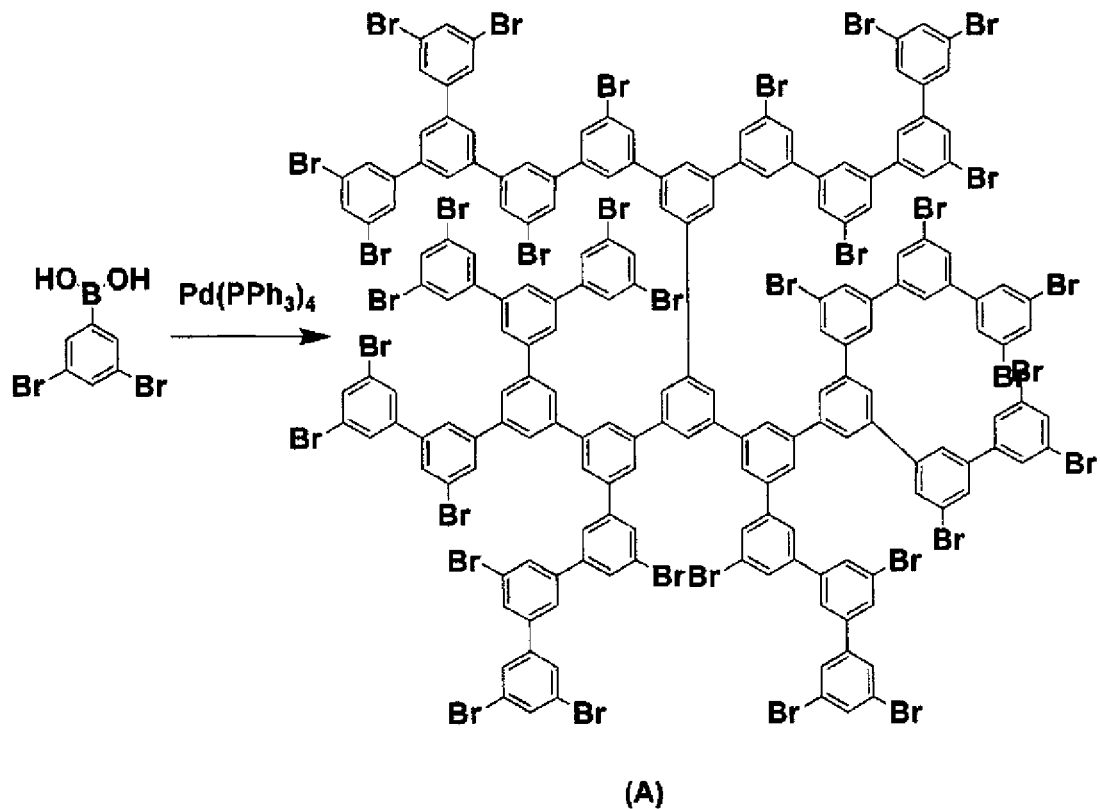

(A)

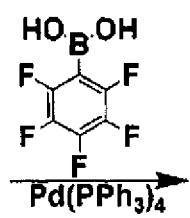

Columns 9 and 10, Reaction Scheme 1, -continued, should read as shown below.
-continued
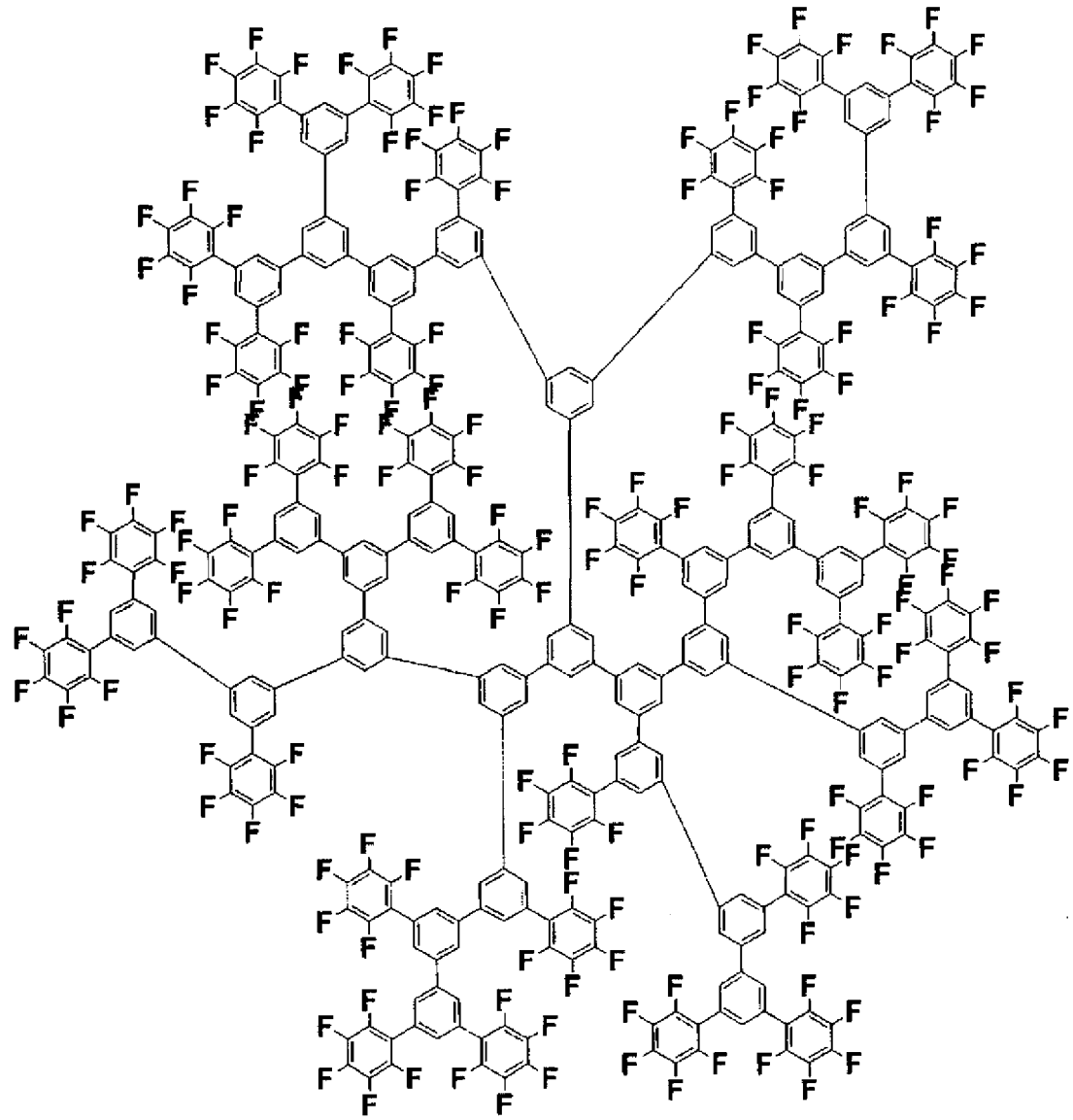

CERTIFICATE OF CORRECTION (continued)
U.S. Pat. No. 8,628,895 B2

In the Claims
Columns 23 and 24, Formula 5 should read as shown below.

Formula 5